United States Patent

[11] 3,546,434

[72] Inventor Konstantin Apel
Meersburg/Bodensee, Lehrenweg 8, Germany

[21] Appl. No. 826,232
[22] Filed May 20, 1969
[45] Patented Dec. 8, 1970

[54] REGULATING SYSTEM FOR HEATING ELEMENTS
6 Claims, 1 Drawing Fig.

[52] U.S. Cl. .......... 219/499
[51] Int. Cl. .......... H05b 1/02
[50] Field of Search .......... 219/499, 501, 505; 323/75(A), 75(E); 317/42

[56] References Cited
UNITED STATES PATENTS
3,211,214 10/1965 Chambers .......... 219/499
3,149,224 9/1964 Horne et al. .......... 219/505

*Primary Examiner*—Bernard A. Gilheany
*Assistant Examiner*—F. E. Bell
*Attorney*—Waters, Roditi, Schwartz & Nissen

ABSTRACT: A regulating circuit which having first and second bridge circuits with common first and second branches connected at a common junction. The bridge circuits each respectively include two further branches connected by the aforesaid first and second branches to the common junction. Each of the branches includes a resistive element and each of the diagonals includes a diode. The resistive elements of one of the additional branches of each bridge circuit is constituted by a thermistor. One of the thermistors is temperature dependent and the other is output dependent. A source of voltage is connected across the bridges. A heating element is provided which is switched into a closed circuit with the source by a relay or an arrangement of a triac and resistor, or an arrangement of counterparallel thyristors. A thyristor is provided which is connected to the diodes and to the aforesaid common junction and is adapted to control the switching operation.

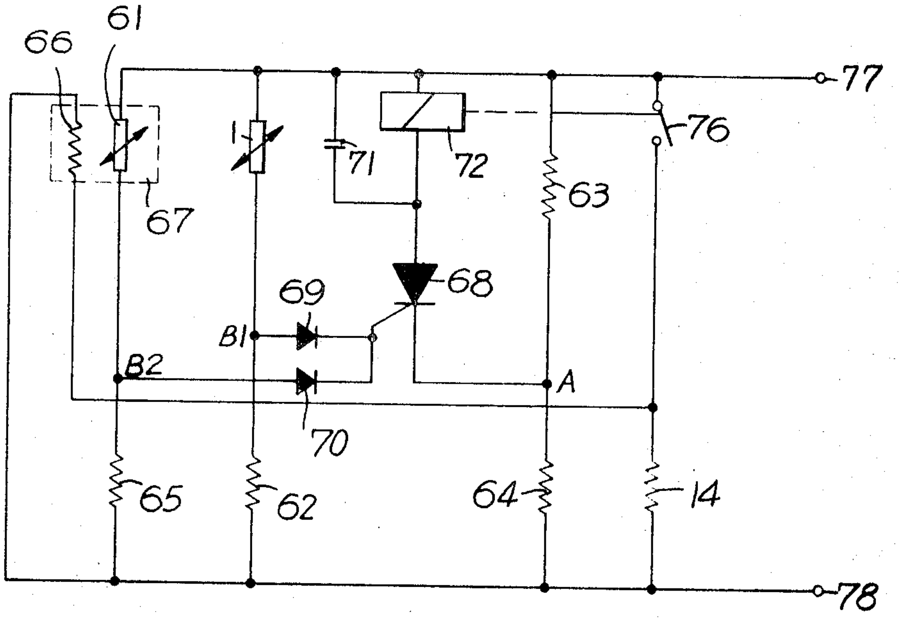
66
61
77
76
1
71
72
67
63
69
68
B1
B2
A
70
65
62
64
14
78

REGULATING SYSTEM FOR HEATING ELEMENTS

Other U.S. Applications: This is an improvement of the invention disclosed in my copending application Ser. No. 767,149, filed Oct. 14, 1968.

DETAILED DESCRIPTION:

This invention relates to a regulating system for heating elements such as, for example, for use in cooking plates provided with at least two regulating-voltage generators as in application Ser. No. 767,149, filed Oct. 14, 1968.

Amongst the examples described in the aforesaid application, there is described a regulating system which makes it possible to regulate preselected temperature ranges in dependence on a temperature sensor arranged in proximity of the heating element or user, or to control the heat output exactly in dependent on an input resistor in series with the user. For this purpose, at least two regulating-voltage generators are used, a first one for the temperature, and a second one for the output, these regulating-voltage generators being connected to a control amplifier via an OR gate, the control amplifier actuating a switching element in the heating element circuit which affects the heat output.

It is an object of this invention to simplify and thereby to improve the arrangement described as an example in the aforesaid application, while retaining all of its advantages.

According to the invention, this is achieved by the provision of two bridges having one common diagonal point A with fixed potential, while their two other diagonal points, carrying temperature-dependent potential (point B 1) or output-dependent potential (point B 2), respectively, are both connected by diodes to the control stage of a thyristor leading to the fixed-potential diagonal point A.

According to one embodiment of the invention, the output-dependent regulating-voltage generator is provided with a thermistor in the bridge circuit which, together with a heating resistor connected in parallel to the heating element, forms a thermally sluggish unit.

According to a further development of the invention, the thyristor controls a relay winding which actuates the relay contact lying in series with the heating element.

According to yet another feature of the invention, the thyristor is connected in series with a resistor, whose voltage drop serves for controlling a triac connected in series with the heating element.

According to a further development of the invention, thyristors in antiparallel connection are used in lieu of the triacs.

DRAWING:

The sole FIG. of the drawing is a schematic circuit diagram of a regulating circuit provided in accordance with the invention.

The arrangement according to the invention improves the embodiment described in the aforesaid application. It makes possible the realization of very simple circuitry, which is of moderate cost and permits accurate regulation.

With reference to the drawing, the invention is next explained relative to an exemplary embodiment. In the drawing, the current path of an improved regulating circuit is shown. Both the temperature-dependent and the output-dependent regulating voltages are generated in two different bridge circuits. The two bridge circuits are connected to the a.c. voltage at the terminals 77 and 78, respectively.

The bridge, from which the temperature-dependent regulating voltage is derived, consists essentially of a thermistor 1, a resistor 62, and resistors 63 and 64. The bridge, furnishing a voltage dependent upon the output absorbed by a load or user, consists essentially of a thermistor 61, a resistor 65, and resistors 63 and 64. Thus the two resistors 63 and 64 are common for the two bridge circuits.

The bridge for the temperature-dependent voltage can be adjusted, for example, by varying resistor 62, or with a resistor in series with the thermistor 1. The bridge for the voltage depending on the power absorbed by the user (heating element) can be adjusted by modification of resistor 65 or by a variable resistor in series with the thermistor 61.

Next to the thermistor 61 associated with the output-dependent bridge, a resistor 66 is arranged. Resistor 66 heats the thermistor 61. Both these elements are combined to form a unit 67 possessing a certain thermal sluggishness. Electrically, the resistor 66 is connected in parallel to the user or heating element 14 and therefore absorbs a current proportional to that flowing through the user or heating current.

Through the combination of thermistor 61 and resistor 66 to form a thermally sluggish unit 67, the latter acts as an integrator, so that the momentary ohmic value of the thermistor 61 becomes a measure for the mean power consumption of the user.

In the diagonals of both bridges lies the control stage of a thyristor 68. Two diodes 69 and 70 form an OR gate in this arrangement. The thyristor assumes the function of a control amplifier and controls a relay 72. The relay switch 76 included by relay 72 switches the user 14. A capacitor 71 connected in parallel with the relay 72 serves for filtering the d.c. voltage generated at the relay.

It is possible to provide a resistor in lieu of the relay 72, in which case however the relay contact 76 would have to be replaced, for example, by a triac or, possibly, by two thyristors in counterparallel connection. The triac, or the counter parallel tyristors, respectively, will then be controlled by the voltage drop occuring at the resistor used in lieu of the relay.

I claim:

1. A regulating circuit comprising first and second bridge circuits including, in common, first and second branches connected at a common junction, said first and second bridge circuits each respectively including two further branches connected to said first and second branches and a diagonal connecting said further branches to said common junction, each of said branches including a resistive element, each of said diagonals including a diode, the resistive elements of one of the further branches of each bridge circuit being constituted by a thermistor, one of the thermistors being temperature dependent and the other output dependent, a source of voltage connected across said bridges, a heating element, means to switch said heating element into a closed circuit with said source, and a thyristor connected to said diodes and common junction and adapted to control said means.

2. A circuit as claimed in claim 1, comprising a resistor in parallel with said heating element and operatively disposed to heat the output dependent thermistor and form a thermally sluggish unit therewith.

3. A circuit as claimed in claim 2, wherein said means includes a relay.

4. A circuit as claimed in claim 2, wherein said means includes a resistor coupled to said thyristor and a triac operatively disposed to be heated by the latter said resistor to switch the heating elements.

5. A circuit as claimed in claim 2, wherein said means includes counterparallel thyristors coupled to the first said thyristor to switch the heating element.

6. A circuit as claimed in claim 2, wherein said means includes a relay coupled to said thyristor.